Aug. 31, 1965  H. J. SCHWERDHÖFER  3,203,519
FREEWHEELING HUB WITH COASTER BRAKE
Filed May 7, 1963

INVENTOR
Hans Joachim Schwerdhöfer
By
Richard Ernst

United States Patent Office 3,203,519
Patented Aug. 31, 1965

3,203,519
FREEWHEELING HUB WITH COASTER BRAKE
Hans Joachim Schwerdhöfer, Schweinfurt am Main, Germany, assignor to Fichtel & Sach A.G., Schweinfurt am Main, Germany
Filed May 7, 1963, Ser. No. 278,615
Claims priority, application Germany, May 11, 1962, F 36,778
4 Claims. (Cl. 192—6)

This invention relates to hubs for driven wheels of bicycles and like vehicles, and more particularly to a freewheeling hub equipped with a coaster brake.

An object of the invention is the provision of a hub of the type described which is small in diameter, and in which the freewheeling mechanism and the coaster brake occupy but a portion of the space available within the hub shell, thus leaving space for a multiple speed transmission.

Another object is the provision of a freewheeling coaster brake hub which has a small number of working elements.

An additional object is the provision of such a hub in which a plurality of working elements is identical so that only a very small number of spare parts needs to be stored for replacement purposes.

A further object is the provision of a bicycle hub the individaul working parts of which are simple and inexpensive to manufacture.

Yet another object is the provision of a hub for bicycles and like vehicles in which individual working elements of the hub perform multiple functions.

With these and other objects in view, the invention in one of its aspects contemplates the use of a hub shell mounted for rotation about an axis on a fixed support such as a stationary axle. A driver member is rotatably mounted on the axle and capable of forward and backward rotation. A ratchet coupling interposed between the driver member and the hub shell rotates the hub shell about its axis only when the driver member rotates in a forward direction. A multiple-disk brake is provided and consists of a first set of friction disks secured against rotation on the support, a second set of such disks is secured to the hub shell for rotation therewith, and a pressure mechanism which moves the friction disks axially toward a position of braking engagement responsive to the backward rotation of the driver member.

Figure 1:
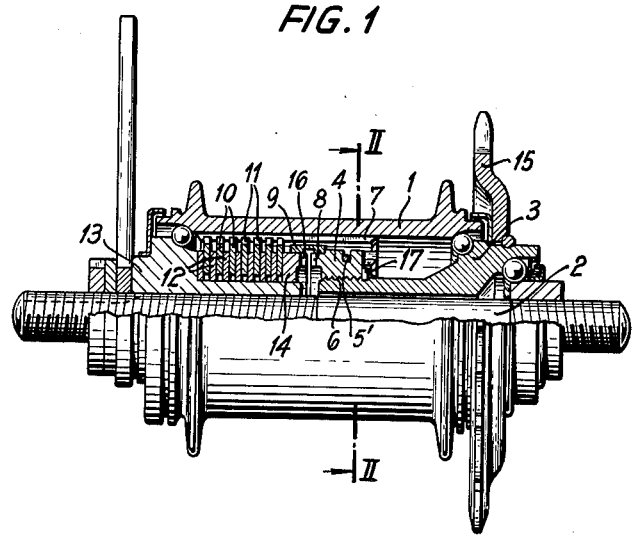
Figure 2:
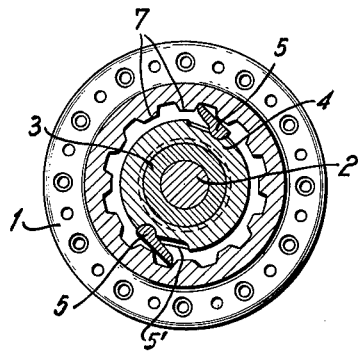

Other features and objects of the invention will become apparent to those skilled in the art as the disclosure is made in the following detailed description of a preferred embodiment of the invention as illustrated in the accompanying sheet of drawing in which:

FIG. 1 shows a bicycle hub of the invention in side elevation, one half of the hub being shown in elevational section on its axis; and FIG. 2 illustrates the hub of FIG. 1 in radial section on the line II—II.

The drawing shows a substantially cylindrical hub shell 1 mounted for rotation about a stationary axle 2. The axle will be understood to be normally fixed in the rear fork of a bicycle. A driver member 3 is rotatably mounted on one axial end of the axle 1 which will hereinafter be referred to as the "drive end." The other end of the axle will be referred to as the "brake end", and the location of the other hub elements will be correspondingly described. The driver member 3 is of generally tubular shape and its inner end portion carries external flat threads 6.

An annular pawl carrier 4 matingly engages the threads 6. Two pawls 5 pivotally mounted on the carrier 4 are urged into engagement with ratchet ribs 7 on the internal face of the hub shell 1 by a pawl spring 5'. Claws 8 propect axially from the pawl carrier 4 toward the brake end of the hub, and an annular spring 9 yieldably engages the pawl carrier 4.

Seven brake disks 10 are axially slidable in the hub shell 1. The ratchet ribs 7 extend from the normal location of the pawls 5 almost to the brake end of the shell 1, and radial lugs 11 projecting from the disks 10 engage the ratchet ribs so as to prevent rotation of the disks 10 relative to the hub shell 1. The disks 10 are axially slidable in the shell 1.

A second set of seven brake disks 12 is conformingly mounted on a splined cylindrical portion of a bearing member 13 which is fixedly attached to the stationary axle 2 and rotatably supports the brake end of the hub shell 1. The drive end of the hub shell is rotatably carried by the driver member 3.

The splines (not shown) on the bearing member 13 also prevent rotation of a ring 14 which is axially interposed between the brake disks 12 and the pawl carrier 4. The disks 12 and the ring 14 are axially movable on the bearing member 13. Claws 16 on the ring 14 are engaged by the claws 8 on the pawl carrier 4 when the latter moves from the illustrated position toward the brake end of the hub. The afore-mentioned annular spring 9 also envelops the ring 14 and frictionaly couples it to the pawl carrier.

The illustrated bicycle hub is operated as follows:

A drive sprocket 15 is fixedly mounted on the driver member 3. During normal forward pedaling, a non-illustrated drive chain trained over the sprocket 15 in the usual manner rotates the driver member 3 in a direction which is counterclockwise as viewed in FIG. 2. The inclination of the threads 6 is such that the pawl carrier 4 is urged to move on the threads toward the drive end of the hub by the braking action of the spring 9. An abutment 17 limits movement of the pawl carrier, and the latter is fixedly positioned as shown in FIG. 1 as long as the driver member 3 rotates in a forward direction. The pawls 5 engage the ratchet ribs 7 as seen in FIG. 2, and the hub shell is driven forward.

When pedaling stops while the hub rotates, the ratchet ribs 7 overtravel the pawls 5, but the braking action of the spring 9 is sufficient to prevent threaded movement of the pawl carrier 4 on the driver member 3 under the slight frictional forces transmitted from the ratchet ribs to the pawls.

Upon back pedaling, the pawl carrier 4 is rotated relative to the driver member 3 because of the motion transmitting connection of the carrier with the stationary axle 2 by the spring 9. In the absence of forces which would interfere with the movement of the pawl carrier 4, the yieldably resilient force of the spring 9 is sufficient to acuate the threaded movement of the pawl carrier until the claws 8 of the carrier engage the claws 16 on the ring 14. The ring being secured against rotation on the axle 2, the spring 9 is no longer relied upon for transmitting forces or movement between the axle and the pawl carrier, and continued back pedaling causes the pawl carrier 4 abuttingly to engage the ring 14 and to press it against the alternatingly stacked disks 12 and 10, thereby compressing the stack and frictionally engaging the cooperating faces of the brake disks. The rotation of the hub shell is slowed down or stopped.

When forward pedaling is resumed, the pawl carrier returns to the illustrated position, and the brake disks are free to move apart, and to push the ring 14 into its terminal position near the drive end of the bearing member 13. An abutment similar to the abutment 17, but not seen in the drawing, will be understood to prevent further axial movement of the ring 14 and engagement of the claws 8 and 16 during forward pedaling when the pawl carrier 14 is in its normal position.

The effective area of the coaster brake constituted by the disks 10, 12 can be made sufficiently great within a hub shell of a diameter substantially smaller than that of a conventional coaster-brake equipped bicycle hub. The ratchet coupling 5, 7 also can be installed in a very slim hub shell. As seen in FIG. 1, the combined axial length of the brake and of the ratchet coupling is sufficiently small to leave space for a multiple speed transmission if such a transmission should be desired.

The ratchet ribs 7 serves jointly as an element of the ratchet coupling, and simultaneously provide anchoring means for the brake disk 10. The total number of operating elements of the hub is small, and the operating elements used constitute sets of identical elements such as the several sets of brake disks and the pawls, thereby holding the number of spare parts required for immediate repairs to a minimum. The individual parts are simple, and may be manufactured at low cost to desirable tolerances.

It should be understood, of course, that the foregoing disclosure relates to only a preferred embodiment of the invention, and that it is intended to cover all changes and modifications of the example of the invention herein chosen for the purposes of the disclosure which do not constitute departures from the spirit and scope of the invention set forth in the appended claims.

What is claimed is:

1. A freewheeling hub for a bicycle and the like comprising, in combination:
   (a) a support
   (b) hub shell means rotatable on said support about an axis;
   (c) a driver member rotatable on said support in a forward direction and in a backward direction;
   (d) a ratchet coupling interposed between said driver member and said hub shell means for selectively rotating said hub shell means about said axis when said driver member rotates in said forward direction, said ratchet coupling including a plurality of ratchet ribs on said hub shell means; and a pawl engageable with each of said ribs and connected to said driver member for joint rotation therewith about said axis; and
   (e) multiple disk brake means including
      (1) a plurality of first friction disk means secured on said support against rotation about said axis;
      (2) a plurality of second friction disk means having respective projections, each projection engaging one of said ratchet ribs and thereby securing the second friction disk means to said hub shell means for rotation therewith,
      (3) said first and second friction disk means being axially movable relative to each other toward and away from a position of braking engagement, and
      (4) pressure means responsive to backward rotation of said driver member for moving said friction disk means toward said position thereof.

2. A hub as set forth in claim 1, wherein said ratchet coupling includes a pawl carrier mounted on said driver member for threaded movement about said axis toward and away from said brake means, said pawl being mounted on said carrier for engagement with said ratchet ribs, and said pressure means includes motion transmitting means connected to said support for threadedly moving said pawl carrier in an axial direction toward said brake means when said driver member rotates in said backward direction for abutting engagement of said pawl carrier with said friction disk means.

3. A hub as set forth in claim 2, wherein said motion transmitting means is a yieldably resilient member.

4. A freewheeling hub for a bicycle and the like comprising, in combination:
   (a) a support;
   (b) hub shell means rotatable on said support about an axis;
   (c) a driver member rotatable on said support in a forward direction and a backward direction;
   (d) a ratchet coupling including a plurality of axially extending ribs circumferentially spaced on said hub shell means about said axis, and pawl means mounted in said hub shell means for axial movement and for rotary movement about said axis while in ratchet engagement with said ribs;
   (e) motion transmitting means operatively connecting said pawl means to said driver member and to said support for actuating rotation of said pawl means about said axis with said driver member when the driver member rotates in said forward rotation, and for axially moving said pawl means in a predetermined direction when said driver member rotates in said backward direction;
   (f) an axially compressible stack of friction disk means including
      (1) first friction disk means secured to said support against rotation about said axis;
      (2) second friction disk means secured against rotation relative to said hub shell means by circumferential engagement with one of said ribs;
      (3) said first and second friction disk means axially moving toward each other for braking engagement when said stack is axially compressed; and
   (g) pressure means in said shell operatively connected to said pawl means and to said stack, said pressure means being responsive to axial movement of said pawl means in said predetermined direction for compressing said stack.

References Cited by the Examiner

UNITED STATES PATENTS

| 1,947,961 | 4/34 | Winkler | 192—6 |
| 2,593,872 | 4/52 | Gohde | 192—19 X |
| 3,135,368 | 6/64 | Shimano | 192—6 |

FOREIGN PATENTS 1,085,057    7/60    Germany.

DON A. WAITE, *Primary Examiner.*

DAVID J. WILLIAMOWSKY, *Examiner.*